United States Patent

Ursic et al.

[15] 3,638,916
[45] Feb. 1, 1972

[54] METHOD AND APPARATUS FOR BLENDING MATERIALS

[72] Inventors: Juan S. Ursic, Bogota, Colombia; Cloral O. Rains, Bartlesville, Okla.

[73] Assignee: Phillips Petroleum Company

[22] Filed: Sept. 1, 1970

[21] Appl. No.: 68,641

[52] U.S. Cl. .................................. 259/4, 259/26, 259/46, 259/149, 259/154, 259/163
[51] Int. Cl. ........................................................ B01f 15/04
[58] Field of Search ..................... 259/4, 2, 154, 26, 46, 149, 259/163, 9, 10, 163, 162, 161

[56] References Cited

UNITED STATES PATENTS

| | | | |
|---|---|---|---|
| 2,788,953 | 4/1957 | Schneider | 259/4 |
| 2,930,595 | 3/1960 | Tarukawa | 259/2 |
| 3,380,717 | 4/1968 | Adams | 259/154 |
| 3,448,967 | 6/1969 | Seanor | 259/154 |

*Primary Examiner*—Robert W. Jenkins
*Attorney*—Young and Quigg

[57] ABSTRACT

A blender continuously receives a plurality of components from material hoppers, continuously blends the components together at a preselected ratio, and discharges the blended material to a blended-material feeder which continuously discharges the blended material at a controlled rate to associated apparatus. The blended-material feeder is regulated to continuously discharge the blended material at a rate substantially equal to the summation of the rates of the material components entering the hopper.

5 Claims, 2 Drawing Figures

INVENTOR
J. S. URSIC
C. O. RAINS
BY Young & Quigg

ATTORNEYS

METHOD AND APPARATUS FOR BLENDING MATERIALS

It is desired to provide an apparatus and a method for avoiding waste of additives that are to be incorporated with a dominant stream of finely divided material and uniformly, homogeneously mixing the additives and dominant material together. This invention therefore resides in an apparatus and method for continuously supplying at a regulated rate a homogeneous resultant material that is formed of material components having a preselected ratio. In the invention, the components are continuously metered and measured into a common hopper with weight-sensing controlling means. The individual material component feeders have associated controlling means for continuously supplying the various components to the hopper in a preselected ratio and rate. A blender is provided for blending the material discharging from the hopper after which said homogeneous material is continuously fed to associated apparatus at a rate regulated to be substantially equal to the summation of the rates of components entering the hopper.

Other aspects, objects, and advantages of the present invention will become apparent from a study of the disclosure, the appended claims, and the drawing.

The drawings are diagrammatic views of the apparatus and control means of this invention.

Figure 1:
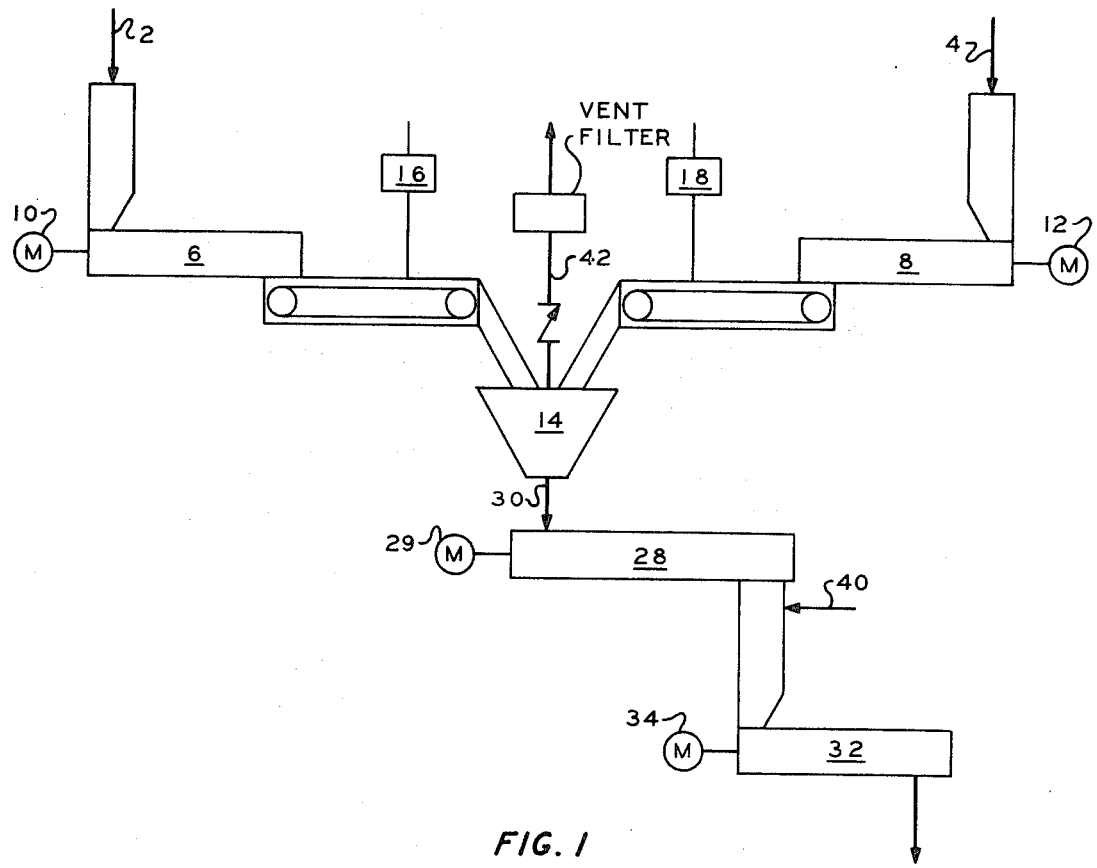
FIG. 1 shows the apparatus of this invention.

Referring to FIG. 1, a first dominant stream 2 of material components, such as polypropylene powder, for example, and at least another stream 4 of additive material, for example a blend of polypropylene powder and additives such as antioxidants, UV stabilizers, and antistatic materials flow from respective material component reservoirs (not shown) into their respective separate feeding means 6,8. These feeding means 6,8 are volumetric-gravimetric type feeders that can be operated at various speeds for controlling the rate of material discharged therefrom. A variable-speed separate power source 10,12 such as a DC electric motor, for example, is connected to each feeding means 6,8. The material components discharge at a preselected controlled feed rate from the feeders flowing into a hopper 14 for mixing of the material components one with another to form a resultant material mix.

By controlling the rate of flow of each material component into the hopper 14 at a rate relative to the flow rates of the other components, the resultant material mix will be maintained at a definite preselected component ratio. The rate of each component discharging from each feeder 6,8 is precisely sensed by separate weighing sensors 16,18 that are each associated with a respective master feeding means 6 and slave feeding means 8. Each weighing sensor 16,18 continuously measures the weight of material components traveling over the respective feeder and delivers a signal representative of that weight to hereafter-described separate associated weight-indicator controllers 20,22 for controlling the rate at which its respective power source 10,12 drives its respective feeding means 6,8.

A blender 28, such as, for example, a ribbon-type blender is connected to or associated with the discharge end of the hopper 14 for continuously receiving a material mix stream 30 discharging from the hopper 14. Within the blender 28 the material mix stream is blended to form a blended homogeneous material. This homogeneous material is discharged from the blender 28 into a blended material feeder 32 that is connected to or associated with the discharge end of the blender 28. The blended material feeder 32 is a volumetric-type feeder that is powered by a variable-speed separate power source 34 such as an electric motor for continuously discharging blended material at a regulated flow rate that is substantially equal to the summation of the flow rates of the material components delivered into the hopper 14.

It is preferred in this invention that the system be closed and that the blender 28 be supplied with a gas intake 40 and an outlet 42 be located on hopper 14 for the passage of gas such as nitrogen, for example, through the blender in contact with the materials therein for purging gaseous mixtures, and specifically oxygen, from said materials. By so purging the gases, including oxygen, from the material, a more uniform, higher quality resultant blended material is obtained. The system is fully enclosed, gastight, and preferably maintained at about 4 oz. $N_2$ internal positive pressure to prevent inclusion of air.

Figure 2:
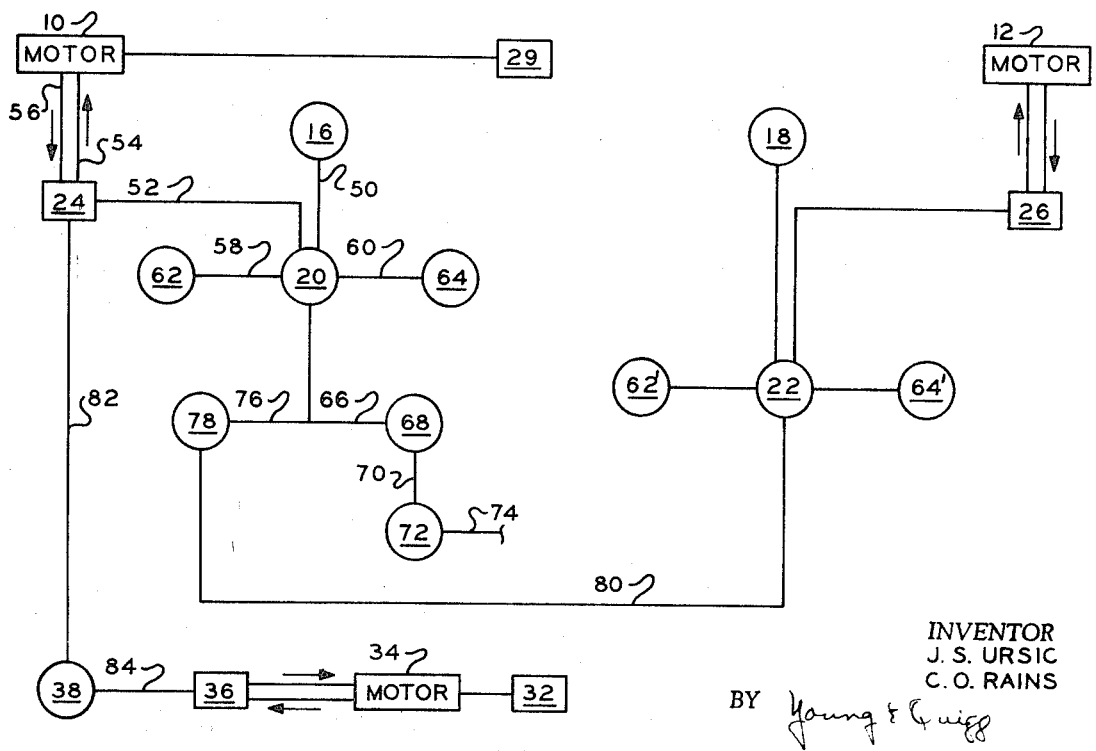
FIG. 2 shows a view of the controls of this invention.

With reference to FIG. 2, a weight-sensor 16 delivers a signal through line 50 to the masterweight indicator-controller 20. The signal received by the controller 20 is representative of the weight of the material passing over the sensor 16 and into the hopper 14. The weight-sensor 16 is, for example, an Acrison LVDT manufactured by Acrison Inc., 180 Broad St., Carlstadt, N.J., having its output terminal connected to line 50 and the masterweight indicator-controller 20 is, for example, an Acrison Model 6401 manufactured by Acrison Inc., 180 Broad St., Carlstadt, N.J., having its input terminal connected to line 50.

In the masterweight indicator-controller 20 the signal received through line 50 is compared to a manual set point and the difference converted and amplified to a signal representative of the signal received through line 50. The output terminal of the masterweight indicator-controller 20 is connected through line 52 to a silicon-controlled rectifier 24 such as, for example, an Acrison ACR-100 SCR manufactured by Acrison Inc., 180 Broad St., Carlstadt, N.J. Line 52 is connected to rectifier 24 at its input terminal. The output terminal of the silicon-controlled rectifier 24 is connected through line 54 to the power source 10 of the master feeder 6. The power source is, for example, a Master type XL gear motor manufactured by Reliance Electric Co., 3300 Tenth St., Columbus, Ind. Line 54 is connected to the motor at the power terminals of the motor 10. A tachometer (not shown) is connected to the motor 10 and to the input terminal of the silicon-controlled rectifier 24 by line 56 for delivering a signal from the motor to the silicon-controlled rectifier 24 that is proportional and representative of the speed of said motor. In the silicon-controlled rectifier 24 the signal received through line 52 is compared to the signal received through line 56 and the result of that comparison is represented as a signal which is delivered to the motor 10 through line 54 for controlling the speed of the feeder 6. The masterweight indicator-controller 20 also delivers its output signal through lines 58 and 60 to a weight recorder 62 and a weight totalizer 64. The signal passes through line 58 to the weight recorder 62 such as, for example, an Esterline Angus A601C manufactured by Esterline Angus Instrument Company Inc., Box 2400, Indianapolis, Ind., 46224, and causes a continuous record to be created of the weight of the material passing over the sensor 16. The signal passes through line 60 to the weight totalizer 64 such as, for example, a Durant Model NO6-YE-40724-401/QS 120 VAC manufactured by Durant Manufacturing Company, Milwaukee, Wis., and causes the weight of material passing over the sensor 16 to be continuously added for recording purposes.

The weight indicator-controller 20 also delivers its output signal through line 66 to a signal converter 68 such as, for example, an RIS Model SC-300X manufactured by Rochester Instrument Systems, Rochester, N.Y., for converting the signal to another utilizable form. The signal converter 68 is connected by line 70 to a ratio relay 72 such as, for example, Motorola RSP-A301-3 manufactured by Motorola Instrument Systems, Phoenix, Ariz. The signal received from line 70 is compared to a manual set point of the ratio relay 72 and an output signal representative of a ratio of the input signal received through line 70 and the set point is delivered through line 74 to a flow recorder-controller (not shown) for associated apparatus for controlling the flow of material through said flow recorder controller.

The signal delivered from the output of the weight indicator-controller 20 passes through line 76 to a ratio potentiometer 78 such as, for example, a Helipot No. 7216-2K manufactured by Beckman Instrument Inc., Heliport Div., 2500 Harbor Blvd., Fullerton, Calif., 92634. The signal received from line 76 by the ratio potentiometer 78 is compared to a manual set point of the ratio potentiometer 78 and a set point output signal representative of a ratio of the input signal received through line 76 and the manual set point of potentiometer 78 is delivered through line 80 to the other weight indicator controller 22 for providing a set point for said controller 22. A weight sensor 18, weight recorder 62′, weight totalizer 64′, silicon-controlled rectifier 26 and motor 12 are connected and function as previously described with reference to apparatus numerals 20,62,64,24 and 10 and are associated with the other weight indicator-controller 22 and function in the same manner. The apparatus differs, however, in the fact that the set point for the indicator-controller 22 is not manual, as in controller 20, but is controlled by an electrical signal delivered through line 80 and representative of the functioning of the apparatus associated with the master feeder 6.

A signal representative of the output of the power source 10 is delivered through line 82 to a ratio potentiometer 38 such as, for example, a Helipot No. 7216–2K manufactured by Beckman Instrument Inc., Helipot Div., 2500 Harbor Blvd., Fullerton, Calif., 92634, which has a manual ratio set point. In the ratio potentiometer 38, the signal received through the line 82 is compared to the ratio set point of the ratio potentiometer 38 and a resultant output signal is delivered from the ratio 38 through line 84 to the silicon-controlled rectifier 36. The silicon-controlled rectifier 36 can be, for example, an Acrison ACR–100 SCR manufactured by Acrison Inc., 180 Broad St., Carlstadt, N.J. The silicon-controlled rectifier 36 is connected to the motor 34 of the blended material feeder 32 and functions to control the feeding rate by regulating and controlling the motor speed as described above with respect to motor 10 and silicon-controlled rectifier 24.

The blender motor 29 is a constant-speed motor which provides power for the desired mixing and uniform discharge of the material entering the blender from the hopper 14.

By manually setting the set point of the weight-indicator controller 20, the ratio set point of the ratio relay 72, and the ratio set point of the ratio potentiometer 38 at preselected values, the feeders can be regulated to supply material at a preselected rate and the resultant blended material from the hopper can be removed at a preselected rate. By therefore utilizing the apparatus and controls of this apparatus, a plurality of materials can be continuously blended together at preselected ratios and rates for discharging a resultant accurately blended material at a continuous preselected rate for further processing or storage.

In the operation of the apparatus the material components are continuously brought together in the hopper 14 each at a controlled rate resulting in a mix having a predetermined component ratio. The resultant material is continuously passed from the hopper into a blender. The materials are purged with an inert gas within the blender and blended together to form a substantially completely homogenized material. The homogenized blended material is then passed from the blender to a blending material feeder where said material is continuously dispensed therefrom at a flow rate substantially equal to the summation of the rates of the material components entering the hopper.

The following example shows quality improvement accomplished by homogeneously blending the materials and purging the materials with inert gas with the continuous material-feeding and mixing apparatus of this invention.

EXAMPLE

An Acrison Model 203–135R master feeder 6 is provided for discharging 4,000 pounds per hour of 230° F. polypropylene powder having a density of 28 pounds per cubic foot. The accuracy of the feeding rate is plus or minus 0.5 percent of the set rate. An Acrison Model MCE 203–105.4 slave feeder 8 discharges on command from the master feeder 6 a ratio of 12.5 percent of master feeder 8 that is equal to about 500 pounds per hour of a 28 pound per cubic foot density polypropylene powder that is blended with additives. The accuracy of the feeding rate is plus or minus 0.5 percent of the set point. Both master and slave feeders discharge to a Strong Scott Model 1MHSB7 (87 cubic feet working capacity) ribbon blender 28. The blender provides 32 minutes of retention time for homogenized blending and purging of the material with inert gas. Purging is accomplished by 5 s.c.f.m. of high purity nitrogen gas. The ribbon blender rotates at 23 r.p.m. and discharges blended material to feeder 32 which meters the blend at a uniform continuous rate upon command by the master feeder 6. The feeder 32 discharges to a subsequent process at an accuracy of plus or minus 1 percent of the set rate. The rate range capacity of the blending system is 2,000 to 9,600 pounds per hour of 26 to 30 pounds per cubic foot density polypropylene powder having 0.9 to 0.92 specific gravity. A typical screen size of the polypropylene powder is as follows:

Weight Percent on U.S. Standard Screen

| Screen Size | Retained | Accumulated |
|---|---|---|
| +20 | 10.4 | |
| +60 | 28.7 | 49.1 |
| +100 | 18.0 | 67.1 |
| +170 | 15.0 | 82.1 |
| +200 | 5.7 | 82.8 |
| Pan | 12.2 | 100.0 |

The subject invention provides improved blending and more accurate feeding for processing a high quality finished product. This quality improvement can result in about 50 percent reduction of rejected material caused by poor dispersion of additives. A savings will be realized in reduced additive cost that is attributed to more accurate feeding and blending of additives. Heretofore utilized apparatus and method requires considerable overdosage of additives in order to attain a minimum additive level in the finished product. A highly accurate dosage in blending is absolutely essential in the manufacture of fiber and film grade polypropylene resins. Such desired accuracy is possible with the apparatus and method of this invention.

Modifications and alterations of this invention will become apparent to those skilled in the art from the foregoing discussion, example, and accompanying drawing, and it should be understood that this invention is not to be unduly limited thereto.

What is claimed is:

1. In an apparatus for mixing at least two finely divided material components together at a predetermined ratio and delivering the resultant mixed materials for further processing, said apparatus having a component reservoir for each material component, a separate feeding means associated with each component reservoir, a separate power means connected to each feeding means for operating the feeding means in feeding the material components to a hopper for mixing of the components together, a separate weighing sensor associated with each feeding means for continuously measuring the weight of each material component delivered by each feeding means to the hopper, and controlling means associated with each weighing sensor and each power means for maintaining at a predetermined ratio the rate of discharge of material components from their respective feeding means into the hopper for mixing of the components therein and forming a resultant material mixture, the improvement comprising:

a blender associated with a discharge end of the hopper for continuously receiving and uniformly blending the material mixture discharging from the hopper;

a blended material feeder associated with a discharge end of the blender for continuously receiving the blended material;

power means connected to the blended material feeder for operating said feeder and discharging blended material from said feeder; and regulating means connected to the blended material feeder power means and to the controlling means for continuously regulating the speed of the blended material feeder for continuously discharging the blended material from said feeder at a flow rate substantially equal to the summation of the flow rates of the material components into the hopper.

2. An apparatus, as set forth in claim 1, wherein the controlling means comprises a silicon-controlled rectifier connected to each power means of each feeding means and connected to the weight sensor of its respective feeding means and the regulating means comprises a silicon-controlled rectifier connected to the power means of the blended material feeder and the power means of one of the feeding means for regulating the speed of the blender relative to the speed of the feeding means.

3. An apparatus, as set forth in claim 1, wherein the feeders of the individual components are volumetric-gravimetric type feeders having a variable-speed power source.

4. An apparatus, as set forth in claim 1, wherein the continuous blended material feeder is a volumetric-type feeder having a variable-speed power source.

5. In a method for mixing at least two finely divided material components together at a predetermined ratio and delivering the resultant mixed materials for further processing, the improvement comprising:

continuously bringing the material components together in a hopper while controlling the rate of delivery of each component to the hopper for maintaining a resultant material having a preselected component ratio;

continuously passing the material from the hopper into a blender;

blending the material mix to form a resultant blended material that is substantially completely homogenized;

passing the blended material from the blender into a blended material feeder; and continuously dispensing the blended material from the blended-material feeder at a rate substantially equal to the summation of the rates of the material components entering the hopper.

\* \* \* \* \*